United States Patent
Resch

(10) Patent No.: US 11,025,965 B2
(45) Date of Patent: *Jun. 1, 2021

(54) PRE-FETCHING CONTENT AMONG DVRS

(71) Applicant: International Business Machines Corporation, Armonk, NY (US)

(72) Inventor: Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/525,059

(22) Filed: Jul. 29, 2019

(65) Prior Publication Data

US 2019/0356935 A1    Nov. 21, 2019

Related U.S. Application Data

(63) Continuation of application No. 15/334,369, filed on Oct. 26, 2016, now Pat. No. 10,448,062.

(51) Int. Cl.
| | |
|---|---|
| *H04N 21/231* | (2011.01) |
| *H04L 29/08* | (2006.01) |
| *H04N 21/2747* | (2011.01) |
| *H04N 21/25* | (2011.01) |
| *H04N 21/218* | (2011.01) |

(Continued)

(52) U.S. Cl.
CPC ... *H04N 21/23106* (2013.01); *H04L 65/4084* (2013.01); *H04L 67/12* (2013.01); *H04L 67/2847* (2013.01); *H04N 21/2181* (2013.01); *H04N 21/232* (2013.01);

(Continued)

(58) Field of Classification Search
CPC . H04L 65/4084; H04L 67/12; H04L 67/2847; H04N 21/2181; H04N 21/23103; H04N 21/23106; H04N 21/232; H04N 21/2393; H04N 21/251; H04N 21/2747
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Rong Le

(74) *Attorney, Agent, or Firm* — James Nock; Andrew D. Wright; Roberts Calderon Safran & Cole, P.C.

(57) ABSTRACT

A processing device implementing a cloud-based digital video recorder (DVR) or providing cloud-based streaming services includes a local memory that can be used for storing content prior to providing the content to requestors. The cloud-based DVR determines an estimated probability that delivery of a particular content item will be requested within a particular period of time, and a difference between current and average loads of a second memory included in another DVR. The cloud-based DVR pre-fetches part or all of the particular content item from other DVR's memory into the local memory based on the estimated probability that delivery of the particular content item will be requested within the particular period of time, and the difference between the current and average loads on the other DVR's memory.

20 Claims, 6 Drawing Sheets

(51) Int. Cl.
*H04L 29/06* (2006.01)
*H04N 21/239* (2011.01)
*H04N 21/232* (2011.01)

(52) U.S. Cl.
CPC ... *H04N 21/2393* (2013.01); *H04N 21/23103* (2013.01); *H04N 21/251* (2013.01); *H04N 21/2747* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,085,226 | A | 7/2000 | Horvitz |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,214,422 | B1 | 7/2012 | Woodward, Jr. et al. |
| 10,448,062 | B2 | 10/2019 | Resch |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0089781 | A1 | 4/2012 | Ranade et al. |
| 2014/0082124 | A1 | 3/2014 | van Coppenolle et al. |
| 2014/0282763 | A1 | 9/2014 | Grube et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

List of IBM Patents or Patent Applications Treated as Related, dated Sep. 11, 2020, 1 page.

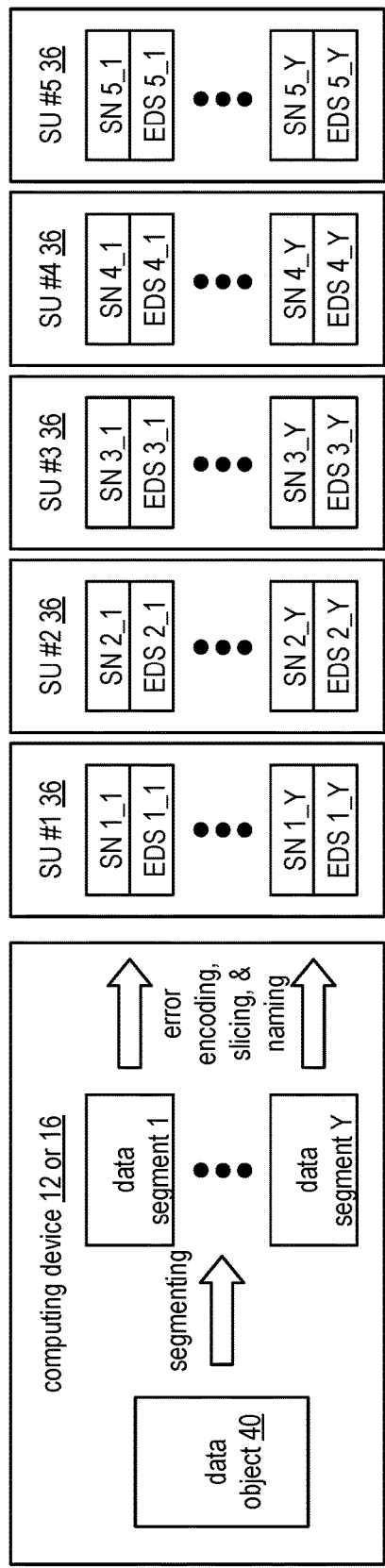
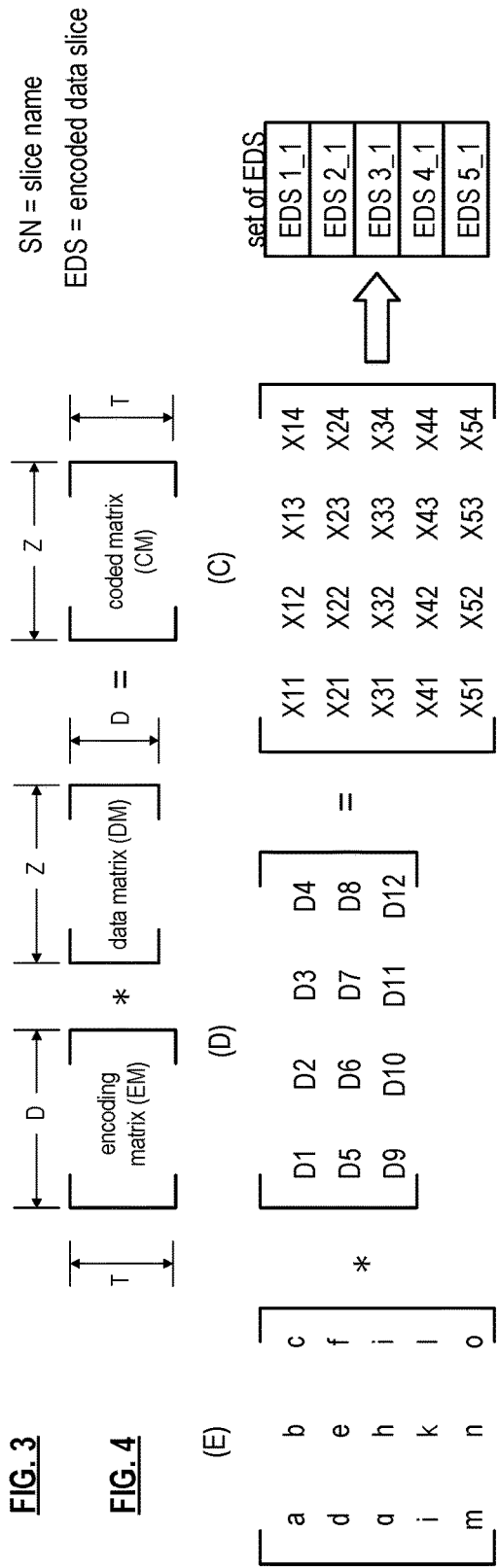
FIG. 3
FIG. 4
FIG. 5
FIG. 6

PRE-FETCHING CONTENT AMONG DVRS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to pre-fetching content from a distributed storage network (DSN) memory and more particularly to restricting pre-fetching operations based on current DSN memory loads.

Description of Related Art

Computing devices are known to communicate data, process data, and/or store data. Such computing devices range from wireless smart phones, laptops, tablets, personal computers (PC), workstations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Cloud storage can be used to remotely implement functionality similar to the functionality provided by a conventional digital video recorder (DVR), including recording, playing back, and scheduling recording of various media content items from various sources. Processing devices implementing this DVR functionality "in the cloud" are sometimes referred to as "cloud-based" DVRs, or "cloud DVRs".

A DSN memory used in conjunction with a cloud DVR or a content streaming service with may suffer from the problem of "peak loads", where demand for accessing and/or recording content maintained within the DSN memory has periods of high load and high demand, along with lulls of low load and low demand. These peaks and valleys in content demand and DSN memory loading can result in inefficient allocation of physical resources, or in potential delays in servicing requests from cloud DVR users.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

A cloud-based Digital Video Recorder (DVR) according to various embodiments contains a memory that can be used for caching content pre-fetched from a distributed storage network (DSN) memory during periods of lower-than-average DSN memory loading, or utilization, if the cloud-based DVR also determines that the content to be pre-fetched is likely to be requested by one or more end users of the cloud-based DVR within a particular period of time. In various embodiments, pre-fetching is performed if the cloud-based DVR finds that the current load on the DSN memory is sufficiently low compared to average loads, and that the content to be pre-fetched has a sufficiently high estimated probability of being requested. The process repeats until the cloud-based DVR has filled its local memory, or until no pre-fetching action can be justified by the current load or by current estimated probabilities of future requests.

In various embodiments, the cloud-based DVR determines whether it is likely that one or more content items will be requested based on one or more of the following: a history of access requests; content popularity; whether the content has been marked to be recorded or viewed in the future; or whether the content is related to similarly accessed content in the past, e.g. other episodes of the same series, or show. By operating in this manner, a cloud-based DVR can help minimize effects of peak DSN memory loads, while minimally impacting the total load on the DSN memory.

Figure 1:
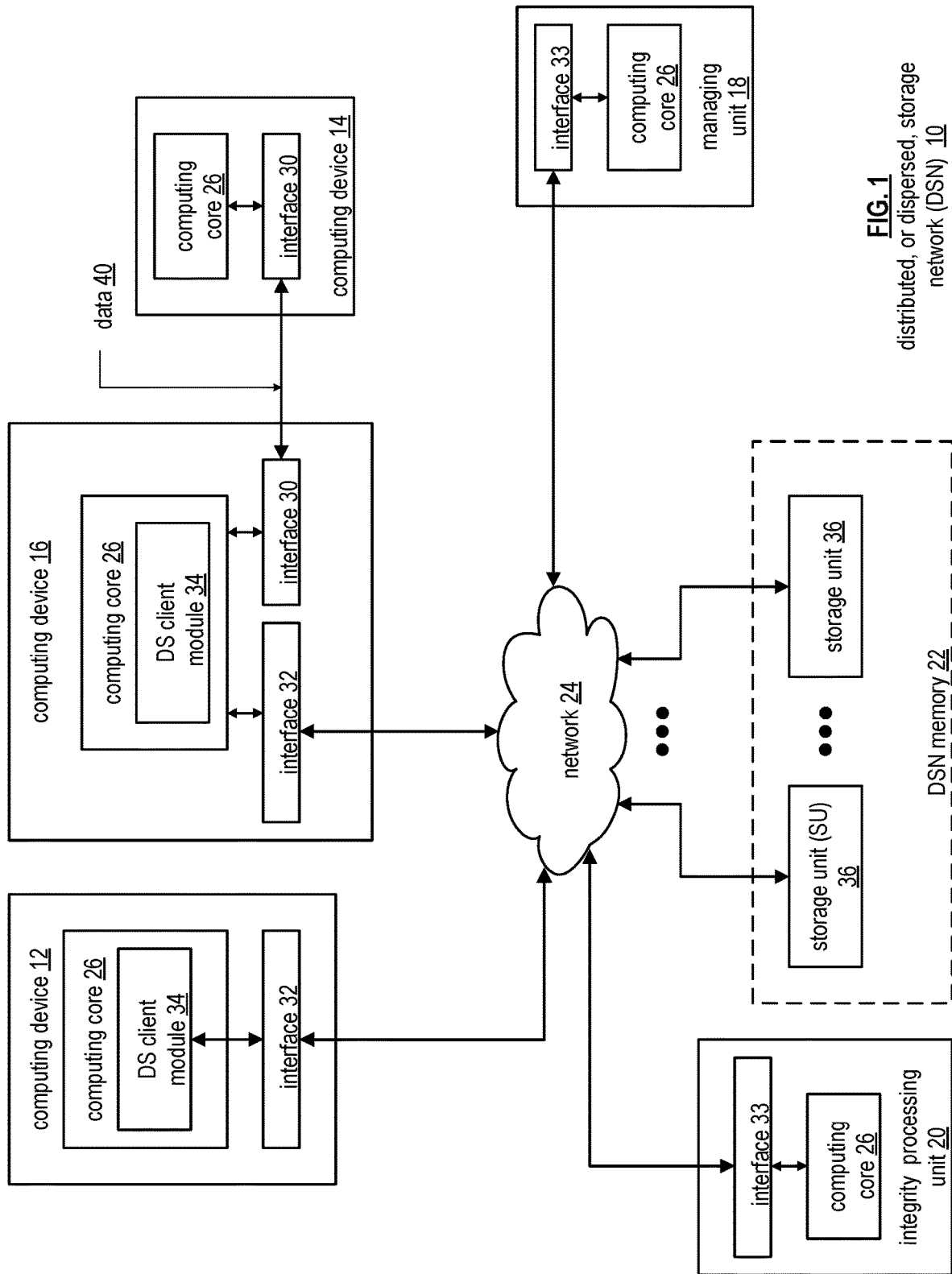
FIG. 1 is a schematic block diagram of an embodiment of a dispersed or distributed storage network (DSN) in accordance with the present invention.

Refer now to FIG. 1, which is a schematic block diagram of an embodiment of a dispersed, or distributed storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
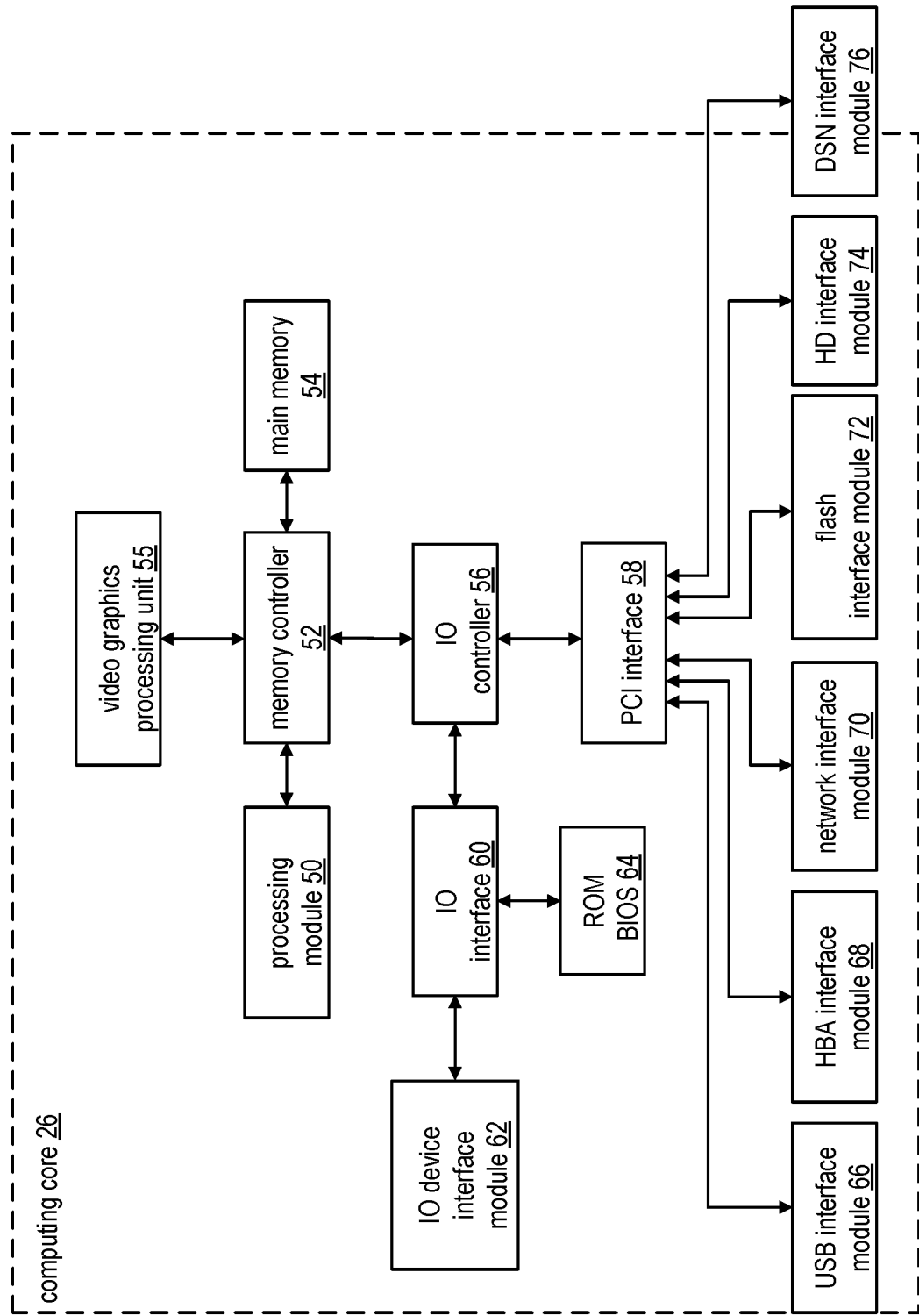
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interfaces 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilobytes to Terabytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
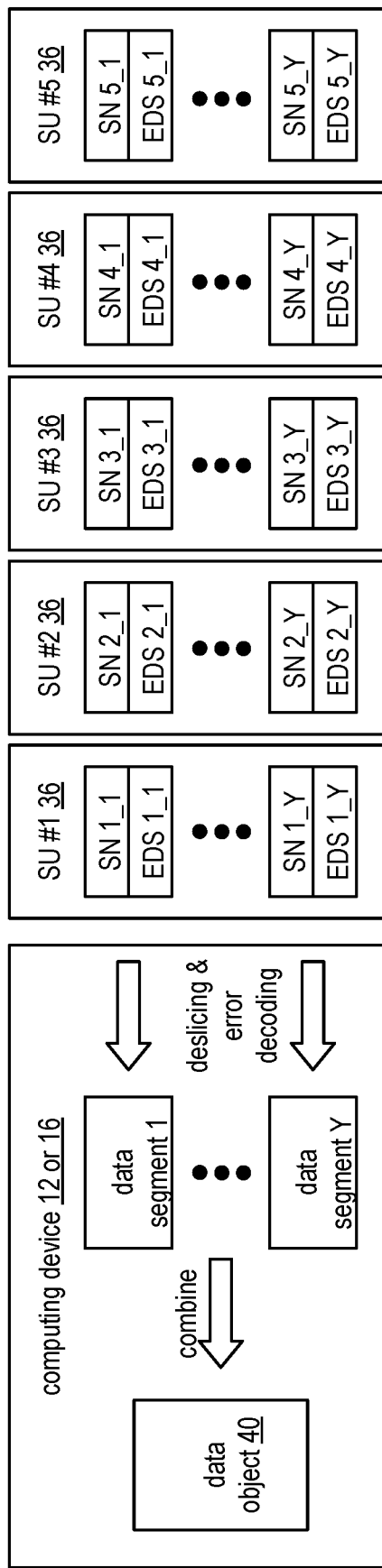
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
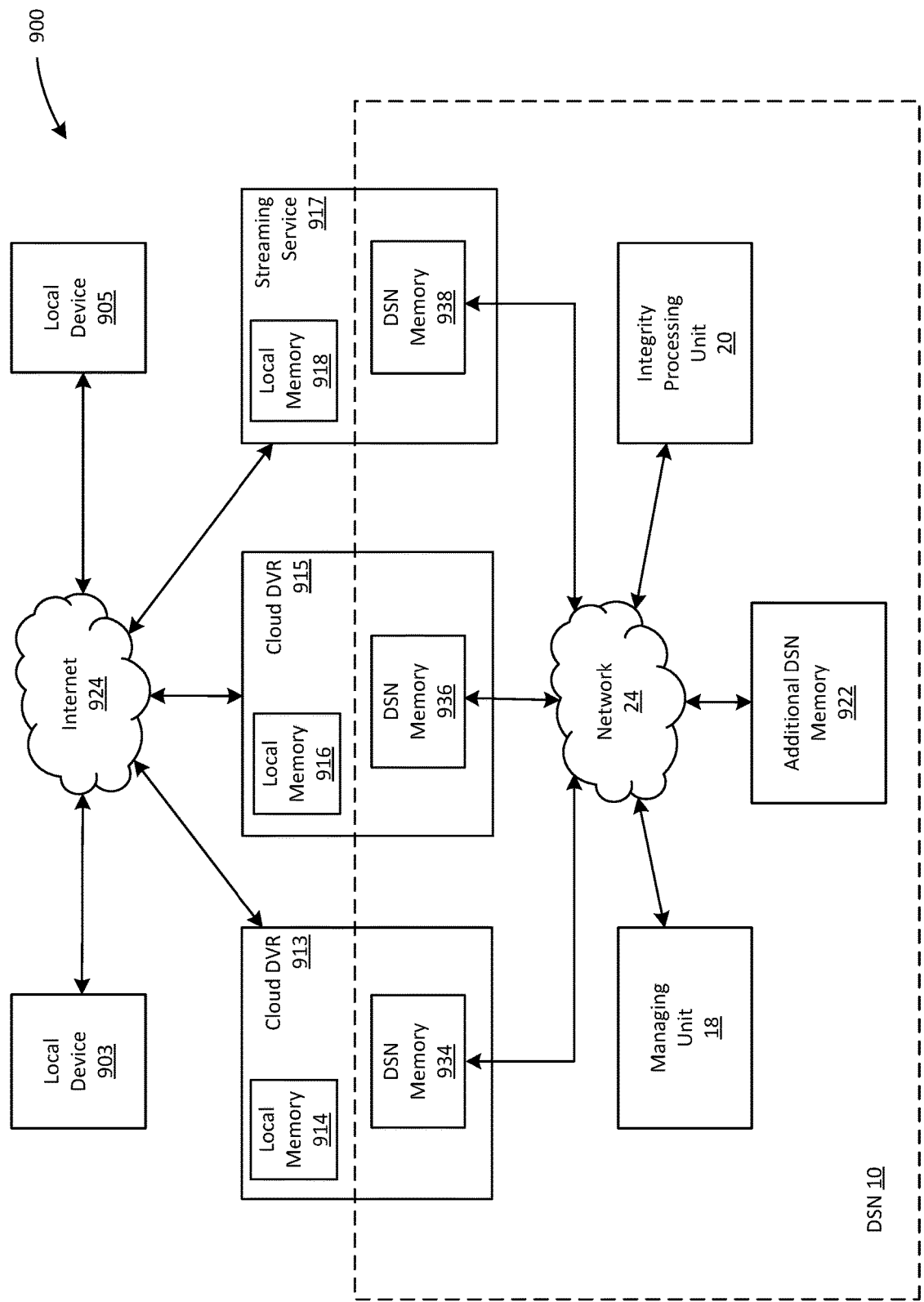
FIG. 9 is a schematic block diagram of an embodiment of a system including cloud-based digital video recorders (DVRs), in accordance with various embodiments of the present invention.

FIG. 9 is a schematic block diagram of an embodiment of a system 900 including cloud-based digital video recorders (DVRs), in accordance with various embodiments of the present invention. System 900 includes digital storage network (DSN) 10; cloud-based DVRs 913 and 915; streaming service device 917, which in some embodiments can be implemented as a cloud-based DVR; local devices 903 and 905; and a wide area network, such as Internet 924, that communicatively couples local devices 903 and 905 to cloud-based DVR 913, cloud-based DVR 915, streaming service device 917.

DSN 10 can include managing unit 18; integrity processing unit 20; DSN memories 934, 936, and 938, and additional DSN memory 922, all of which are communicatively coupled via network 24. DSN memories 934, 936, and 938 can be included in, and in some implementations local to, cloud-based DVRs 913 and 915, and streaming service device 917. Cloud-based DVRs 913 and 915, and streaming service device 917 also include local memories 914, 916, and 918. The term "local memory" allows, but does not require, the memory to be in the same physical housing as the processing device implementing the cloud-based DVRs or streaming service device. Instead, a "local memory" can include a memory available to the cloud-based DVR via a local area network or personal area network, as opposed to a wide-area-network, connected to the cloud-based DVR via a universal serial bus (USB), or connected to a serial, parallel, or other port allowing direct connectivity.

In operation, cloud-based DVRs 913 and 915, and streaming service device 917, receive commands and/or requests related to playback, storage, or other DVR functionality from local devices 903 and 905. For example, local device 903 can issue a "play" command to cloud-based DVR 915. Information, for example metadata, sent by local device 903 in conjunction with the "play" command can include information identifying a particular media content item to be delivered to local device 903 for playout to an end user associated with local device 903. Cloud-based DVR 915 can respond to the "play" command by issuing a read request to DSN memory 936, which can retrieve some or all of the encoded data slices required to decode the media content item associated with the read request from various storage units included in DSN memory 936.

In some cases, DSN memory 934 can retrieve any additional data slices needed to obtain a read threshold number of data slices from DSN memory 934, DSN memory 938, and/or from additional DSN memory 922, which are generally not co-located with DSN memory 934, but may be co-located in some embodiments. DSN memory 936 uses the read-threshold number of data slices to decode the content, and transmits the content to cloud-based DVR 915, which can then stream or otherwise deliver the content to the requesting device, local device 903. In some embodiments, in response to receiving a read request, DSN memory 936 can deliver the decoded content to local device 903 on behalf of cloud-based DVR 915.

In another example, local device 905 can send a "record" request to cloud-based DVR 913, which schedules for recording at an indicated time, or for an indicated duration, one or more media content items being broadcast or otherwise delivered to local device 905. At the time for recording, cloud-based DVR 913 obtains the content being delivered to local device 905, and delivers that content to DSN memory 934 in conjunction with a write command. DSN memory 934 can segment, slice, and encode the data, as discussed previously, in preparation for storage in one or more different storage units used by DSN memory 934.

In some embodiments, cloud-based DVR can respond to the "record" request by checking to see if any of the DSN memories included in DSN 10 have previously stored the content item to be recorded. In some such embodiments, DSN memory 934 can obtain the content from one or more other DSN memories. Additionally, if DSN memory 934 or one of the other DSN memories included in DSN 10 can link a previously stored content item to the "record" request, so that the content item can be, in effect, pre-recorded prior to the time specified by the "record" request.

Any particular one of the DSN memories can experience periods of heavy usage, or loading, and other periods of light loading. For example, cloud-based DVR 913 might experience a heavy volume of playback, record, rewind, fast forward, pause, and similar commands during a popular sporting event, or during evening hours on a particular day of the week. In response to the heavy volume of commands, cloud-based DVR 913 is likely to issue a heavy volume of access commands to DSN memory 934. In at least one embodiment, cloud-based DVR 913 can prepare for these high-volume periods by pre-fetching some content from DSN memory 934 during periods of lower-than-average usage, and caching the pre-fetched content in local memory 914. If local device 903 or 905 sends an access request for pre-fetched content during a period of high loading of DSN memory 934, cloud-based DVR 913 can service the access request using the cached content, thereby eliminating the need for DSN memory 934 to process the access request.

Figure 10:
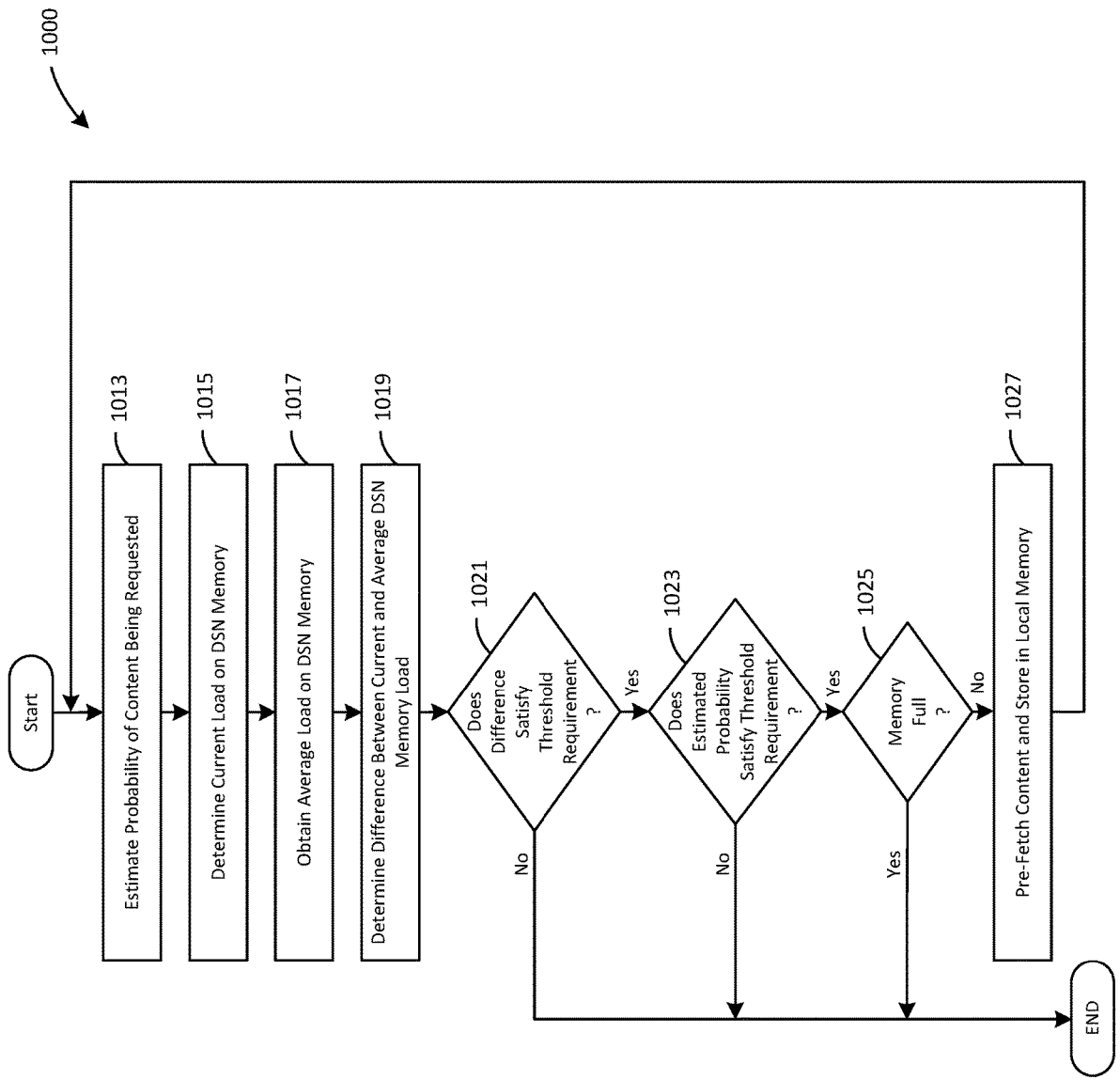
FIG. 10 is a logic diagram of an example of a method of pre-fetching content in accordance with various embodiments of the present invention.

Referring next to FIG. 10, method 1000, which is an embodiment of pre-fetching content by cloud-based DVRs or streaming service devices, will be discussed in accordance with various embodiments of the present invention. Method 1000 begins at block 1013, where a cloud-based DVR or cloud-based streaming service implemented on a computing device estimates the probability that access to one or more particular content items will be requested for playback, recording, or the like.

The probability that any particular content item will be requested can be determined using, for example, heuristics based on a history of access requests for the content item or similar content items, the popularity of the content item, whether or not the content item has been marked for recording or viewing in the future, and whether or not related content has been accessed. For example, if historical trends indicate that the number or frequency of recording or viewing requests for a particular media item have been increasing on Wednesday evenings between the hours of 7 pm and 9 pm, the cloud-based DVR can determine that the media item is likely to be requested during on an upcoming Wednesday evening during the 7 pm-9 pm time frame. Similarly, the content item could be flagged as likely to be requested if the popularity of the media item, for example as indicated by a popularity chart listing or poll, indicates a ranking of the media item in the "top 10" or "top 20" most viewed items. Popularity can also be based on historical trends based on access requests associated with one or more particular cloud-based streaming services, one or more cloud-based DVRs, one or more DSN memories, or the like. Additionally, viewing, recording, or accessing to related content, for example a previous episode of a multi-part series or show, can be used to indicate a higher likelihood of receiving requests to view or record the newest episode of that series.

In various embodiments, any particular media item can be designated as "likely to be requested" if a probability of content being requested exceeds a probability threshold value. In various embodiments, a probability threshold value can be determined or adjusted based on empirically collected historical data associated with a particular DSN memory, a particular DSN, a particular cloud-based DVR or streaming device, or some combination thereof. In some embodiments, the probability threshold value can be a fixed or hard-coded value, while in other embodiments the probability threshold value can be adjusted periodically or on a continual basis.

As illustrated by block 1015, the cloud-based DVR can determine a current load on a DSN memory from which the cloud-based DVR obtains some or all requested content. In at least one embodiment, the current load can be determined based on network measurements obtained from a DSN managing unit, based on information obtained from the DSN memory, based on measurements or other information obtained by the cloud-based DVR, based on information obtained from a communications carrier, or the like.

As illustrated at block 1017, the average load on the DSN memory is determined by the cloud-based DVR. The average load on the DSN memory can be determined based on historical measurements or inference of network parameters based on historical measurement. These measurements can be made by the cloud-based DVR, or obtained a DSN memory, a DSN managing unit, a communications carrier, or the like. Additionally, an average load value can be obtained by the cloud-based DVR from a DSN memory, a DSN managing unit, a communications carrier, or the like.

As illustrated by block 1019, a difference between the current DSN memory load and the average DSN memory load can be determined. This difference can be positive, meaning that the current load is greater than the average load, or negative, which indicates that the current DSN memory load is less than the average DSN memory load. In other embodiments, the converse is true, where a negative value indicates that the current load is greater than the average load. Furthermore, the difference can be normalized and adjusted using various factors, providing a unitless comparison of the two loads. In some embodiments, however, DSN memory load can be measured in terms of throughput, latency, number of access requests, processor utilization, or the like.

In various embodiments, the difference between a current and average load can be used in conjunction with a difference threshold specifying a degree or amount of difference required to initiate content pre-fetching by the cloud-based DVR. So, for example, the difference threshold may specify that pre-fetching will not be initiated if the current load is, for example, more than 1.3 times the average load. In some implementations, the difference threshold can be set so that if the current load is less-than or equal-to the average load, pre-fetching is allowed. In yet other embodiments, the difference threshold can be set to allow pre-fetching if the difference between the current and average DSN memory load is sufficient to allow pre-fetching of one or more particular content items without exceeding the average DSN memory load.

The difference threshold value can be determined or adjusted based on empirically collected historical data associated with a particular DSN memory, a particular DSN, a particular cloud-based DVR or streaming device, or some combination thereof. In some embodiments, the probability threshold value can be a fixed or hard-coded value, while in other embodiments the probability threshold value can be adjusted periodically or on a continual basis.

As illustrated by block 1021, a check is made to determine whether the difference determined at block 1019 satisfies the difference-threshold requirement for initiating a content pre-fetch. If the difference does not satisfy the difference-threshold requirement, method 1000 ends, because the load on the DSN memory is considered to be too great to justify pre-fetching operations, regardless of how likely it is that a request for read or write access to any particular content item will be requested.

If, however, the difference does satisfy the difference-threshold requirement, a check is performed, as illustrated by block 1023, to determine whether the estimated probability of a content item being requested satisfies the probability threshold requirement. A positive comparison indicates that there is a sufficient likelihood that a particular content item will be requested to justify pre-fetching that content item. If it is determined at block 1023 that the estimated probability of receiving a request for a particular item is not sufficient to cause cloud-based DVR to pre-fetch that content item from the DSN memory, method 1000 ends.

In various embodiments, the probability threshold can vary depending on the value of the difference threshold. Thus, for example, if the loading of the DSN memory is significantly below average, the probability threshold can be set to allow pre-fetching of less-probable content, while the probability threshold can be set to allow pre-fetching of only the most highly probable content items when DSN memory loading is closer to or exceeding the average load.

As illustrated by block 1025, if the difference between current and average DSN loading satisfies the difference threshold, and the estimated probability satisfies the probability threshold, another check is made to determine if the local memory of the cloud-based DVR has sufficient remaining storage capacity to allow pre-fetching of a particular content item. If the check at block 1025 indicates that the local memory of the cloud-based DVR is too full to allow prefetching of the content item under consideration, method 1000 ends without pre-fetching the content item—even though it is highly probably that the content item will be requested and the loading of the DSN memory is low.

If the check at block 1025 indicates that the local memory of the cloud-based DVR is not too full, the content item is pre-fetched from the DSN memory and stored in the local memory of the cloud-based DVR, as illustrated by block 1027. Method 1000 then repeats, continuing to pre-fetch and store particular additional content items as long as the local memory has sufficient storage to store the additional content items, the estimated probability associated with a particular additional content item satisfies a probability-threshold requirement, and the difference between the current load of the DSN memory and the average load of the DSN memory remains above a difference-threshold requirement, indicating in some embodiments that the additional load required by the pre-fetching operation will not overburden the DSN memory.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   determining, at a first cloud-based DVR, an estimated probability that delivery of a particular content item will be requested within a particular period of time by a requesting device associated with a user of the first cloud-based DVR, wherein a first portion of the particular content item is stored in a first memory local to the first cloud-based DVR, and a second portion of the particular content item is stored in a second memory local to second cloud-based DVR;
   determining, at the first cloud-based DVR, a difference between a current load and an average load of the second memory;
   determining, at the first cloud-based DVR, whether a variable probability threshold associated with the particular content item is satisfied, the variable probability threshold indicating whether a request probability associated with the particular content item is sufficient to justify pre-fetching the second portion of the particular content item from the second memory, given the difference between the current load and the average load of the second memory; and
   pre-fetching the second portion of the particular content item from the second memory based on the request probability associated with the particular content item satisfying the variable probability threshold.

2. The method of claim 1, further comprising:
   determining the estimated probability based, at least in part, on information indicating content popularity of the particular content item.

3. The method of claim 1, further comprising:
   determining the estimated probability based, at least in part, on whether the particular content item has been marked for future delivery.

4. The method of claim 1, further comprising:
   determining the estimated probability based, at least in part, on a history of access requests.

5. The method of claim 4, further comprising:
   determining the current load of the second memory based on network measurements obtained from a network storage managing unit.

6. The method of claim 1, further comprising:
   continuing to pre-fetch additional content items as long as the following conditions are true:
   the first memory has sufficient storage to store the additional content items;
   an estimated probability associated with a particular additional content item satisfies a probability-threshold requirement; and
   the difference between the current load of the second memory and the average load of the second memory remains above a difference-threshold requirement.

7. The method of claim 1, further comprising:
   storing the particular content item in the first memory of the first cloud-based DVR after the particular content item is pre-fetched; and
   streaming the particular content item to the requesting device.

8. A cloud-based digital video recorder (DVR) comprising:
   a computing core including processing circuitry and associated memory;
   a local memory configured to store media items for delivery to requesting devices;
   a first shared memory accessible by other cloud-based DVRs;
   at least one network interface coupled to at least a second cloud-based DVR including a second shared memory, the first shared memory and the second shared memory configured to store different portions of a particular content item;
   the at least one network interface further coupled to requesting devices via a wide area network;
   the computing core configured to:
   determine an estimated probability that delivery of a particular content item will be requested;
   determine a difference between a current load and an average load of the second shared memory;
   determine whether a variable probability threshold associated with the particular content item is satisfied, the variable probability threshold indicating whether the estimated probability associated with the particular content item is sufficient to justify pre-fetching a portion of the particular content item from the second shared memory, given the difference between the current load and the average load of the second shared memory; and pre-fetch the portion of the particular content item from the second shared memory based on the estimated probability associated with the particular content item satisfying the variable probability threshold.

9. The cloud-based DVR of claim 8, wherein the computing core is further configured to:
determine the estimated probability based, at least in part, on information indicating content popularity of the particular content item.

10. The cloud-based DVR of claim 8, wherein the computing core is further configured to:
determine the estimated probability based, at least in part, on whether the particular content item has been marked for future recording.

11. The cloud-based DVR of claim 8, wherein the computing core is further configured to:
determine the estimated probability based, at least in part, on a history of access requests.

12. The cloud-based DVR of claim 8, wherein the computing core is further configured to:
determine the current load of the second shared memory based on network measurements obtained from a network storage managing unit.

13. The cloud-based DVR of claim 8, wherein the computing core is further configured to:
pre-fetch and store particular additional content items in the local memory until one or more of the following conditions occurs:
the local memory has insufficient storage to store the additional content items;
an estimated probability associated with a particular additional content item fails to satisfy a probability-threshold requirement; or
the difference between the current load of the second shared memory and the average load of the second shared memory falls below a difference-threshold requirement.

14. The cloud-based DVR of claim 8, wherein the computing core is further configured to:
stream the particular content item to a device associated with a user of the cloud based DVR.

15. A method comprising:
determining, at a processing device, whether an estimated probability of receiving a request for delivery of one or more specific content items from one or more media delivery devices exceeds a probability threshold, wherein the processing device includes a first memory coupled to a second memory included in a cloud-based digital video recorder (DVR), the first memory and the second memory configured to store portions of the one or more specific content items;
determining, at the processing device, whether a difference between a current load and an average load of the second memory included in the cloud-based DVR satisfies a difference-threshold requirement;
determining, at the processing device, whether a variable probability threshold associated with the one or more specific content items is satisfied, the variable probability threshold indicating whether an estimated probability of receiving a request for delivery of one or more specific content items is sufficient to justify pre-fetching a portion of the one or more specific content items stored in the second memory, given the difference between the current load and the average load; and
pre-fetching the portion of the one or more specific content items stored in the second memory from the cloud-based DVR to the first memory in response to a request probability associated with the one or more specific content items satisfying the variable probability threshold, and further in response to the difference exceeding the difference-threshold requirement.

16. The method of claim 15, wherein determining the probability threshold includes:
determining an estimated probability based, at least in part, on information indicating content popularity of the one or more specific content items.

17. The method of claim 15, wherein determining the probability threshold includes:
determining an estimated probability based, at least in part, on whether the one or more specific content items have been marked for future delivery.

18. The method of claim 15, wherein determining the probability threshold includes:
determining the current load of the second memory based on network measurements obtained from a network storage managing unit.

19. The method of claim 15, further comprising:
continuing to pre-fetch portions of additional content items from the cloud-based DVR, so long as the following conditions are true:
the first memory has sufficient unused capacity to store the portions of the additional content items;
an estimated probability of receiving a request for delivery of a particular additional content item exceeds the variable probability threshold; and
the difference between the current load and the average load of the second memory remains above the difference-threshold requirement.

20. The method of claim 15, further comprising:
storing the one or more specific content items in the first memory after the portions of the one or more specific content items are pre-fetched; and
streaming the one or more specific content items to the one or more media delivery devices.

* * * * *